March 21, 1967   N. E. HAGER, JR   3,310,655
CALENDER ROLL HAVING CONTROLLABLY HEATED SURFACE
Filed Feb. 23, 1966   2 Sheets-Sheet 1

INVENTOR
NATHANIEL E. HAGER, JR.

BY *Theodore L. Thomas*

ATTORNEY

United States Patent Office 3,310,655
Patented Mar. 21, 1967

3,310,655
CALENDER ROLL HAVING CONTROLLABLY
HEATED SURFACE
Nathaniel E. Hager, Jr., Lancaster, Pa., assignor to Armstrong Cork Company, Lancaster, Pa., a corporation of Pennsylvania
Filed Feb. 23, 1966, Ser. No. 529,511
4 Claims. (Cl. 219—470)

This application is a continuation-in-part of application Ser. No. 362,603, filed Apr. 27, 1964, which is in turn a continuation-in-part of application Ser. No. 168,154, filed Jan. 23, 1962, both now abandoned.

This invention relates generally to a calender or press roll in which limited portions of the face of the roll may swiftly be brought to a relatively high temperature and swiftly cooled.

Heated calender or press rolls are normally heated through their entire length and diameter in order to impart heat to the object being calendered. The entire roll is then maintained at the desired temperature. It would be highly desirable for a calender or press roll to present a heated surface to the object being calendered only in those areas where it is physically in contact with the object. The surface of the calender or press roll would thus be heated only in a limited zone of its outer periphery and along the axial length of the cylinder, the remainder of the surface of the calender being cool. It would also be desirable if the heated roll could be quickly cooled along a portion of its surface during one revolution in order to aid separation of the object being calendered from the surface of the calender roll.

It is the primary object of the present invention to present such a roll. It is a further object of the present invention to present a sturdy calender roll which may be used in those processes in which hot calender rolls are normally used and yet which supply heat to the object being calendered only in the regions where the calender roll presses against the object to be calendered.

The invention contemplates a calender roll having a chemically inert outer skin or surface and, positioned just beneath said skin, a rapid cycle heating unit. The rapid cycle heating unit comprises an electrically insulated thin metal foil heater, preferably having a serpentine configuration, in sheet form adapted to supply heat uniformly to the area to be heated, a heat sink in the interior of the roll coextensive in area with the heater and having a thermal conductivity of at least about 300 B.t.u.-inch/hr.-ft.$^2$-° F., and 0.0001–0.05 inch of thickness of thermal insulation coextensive in area with said heater and said heat sink, the insulation having a maximum thermal conductivity of about 2 B.t.u.-inch/hr.-ft.$^2$-° F., positioned between and in contact with said heater and said sink.

The metal foil heater in serpentine shape may be made of any of the metals fabricated into foils such as copper, aluminum, stainless steel, other steels, low expansion alloys such as Invar and other nickel alloys, and any other conductive metal foils. The foils are all thin and will have a thickness in the range of about 0.0001–0.05 inch. Stainless steel is the foil of choice. Higher temperatures are more satisfactorily maintained during operation by using a foil resistance heater of stainless steel resistant at elevated temperatures to oxidation and other deleterious influences. The serpentine heater will be in the form of a narrow strip arranged in a serpentine pattern or configuration in the form generally of a sheet. The strip itself may vary in width from about ½ inch down to about ⅛ inch, with ¼ inch the preferred width. Such serpentine foil patterns are known in the art. They may be prepared by starting with a solid sheet of metallic foil and cutting strips therefrom with a razor blade or other similar cutting instrument. In this manner the finished heater is in the form of a sheet. Several serpentine patterns may be cut out at once by superimposing several layers of foil sheets and cutting through the several thicknesses. The sheets may easily be mechanically cut in any desired size. Alternatively, the strip to be removed may be etched away in accordance with known technics. The serpentine configuration will in most instances cover almost the entire area of the uncut original sheet or metal foil. The strips removed in order to leave the serpentine configuration will generally be about ¹⁄₁₆ inch, although they may be smaller or larger according to the function of the heater. When electrical current is passed through the serpentine pattern, heat is generated by virtue of the resistance of the thin metal foil. An increase of the electrical current increases the heat put out by the heater; the more current, the more power.

The heat sink to be used in the heating unit of the present invention must have a thermal conductivity of at least about 300 B.t.u.-inch/hr.-ft.$^2$-° F. This minimum heat conductivity ensures that the heat flowing into the heat sink will be carried away from the foil heater with sufficient rapidity. There is no unworkable upper limit for the thermal conductivity of the heat sink. Conductivities of 3000 B.t.u.-inch/hr.-ft.$^2$-° F. would be workable. In most cases, the heat sink will merely be the mass of metal in the interior of the calender roll. Alternatively, the heat sink may comprise a heat exchanger, for example a water-cooled heat exchanger, constructed as an integral part of the calender roll in a manner known to the art. The heat sink itself does not change temperature appreciably as compared with the maximum temperature obtained by the heater. After continuous use, the heat sink portion of the heating unit of the present invention will most preferably not rise in temperature more than about 20° F. above the ambient temperature at which the unit starts, if that. However, under extreme conditions of heating, the heat sink may undergo a temperature rise within about 100° F. of the maximum temperature obtained by the heater itself, but preferably, the temperature differential between the heater and the heat sink will not be less than 200° F. To the extent that the heat sink approaches the temperature of the heater within the limits stated, the heating unit will not respond as rapidly during the cooling cycle.

Another critical structure of the heating unit used in the present invention is a sheet of thermal insulation having a thickness in the range of about 0.0001–0.05 inch. The thermal insulation has a maximum thermal conductivity of about 2 B.t.u.-inch/hr.-ft.$^2$-° F. Preferably, the maximum thermal conductivity will be about 0.50 B.t.u.-inch/hr.-ft.$^2$-° F., or less.

The thermal insulation is not primarily electrical insulation. It is positioned between the metal foil heater and the heat sink. The function of the thermal insulation is to delay the flow of heat from the heater into the interior of the calender roll in a controlled manner so the complete cycle of heating and cooling may be adjusted according to the heating needs of the calendering operation. Most usually, the thermal insulation will be adhesively secured by means of a rubbery or resinous or amorphous film to the heat sink, and the serpentine heater will be secured to the thermal insulation in like manner. The thermal insulation is thus in physical contact with both the serpentine heater and the heat sink by being positioned therebetween. By varying the thickness of the thermal insulation within the stated limits, the complete heating and cooling cycle of the heating unit may be changed by increasing or decreasing either the heating portion or the cooling portion of the complete cycle. When the insulation is made thinner, the cooling phase of the complete cycle is shorter, while additional time or a higher power level may be needed to reach peak temperature. When the thermal insulation is thicker, the cooling cycle is lengthened and a shorter time or lower power level will be needed to reach peak temperature. The heating phase is shorter when the insulation is thick, and the cooling phase is shorter when the insulation is thin, with any given insulation. Changing the thermal conductivity of the thermal insulation within the stated limits will have the same effect.

The thermal insulation may be fibrous sheets such as papers and felts made from various fibers such as cellulose, synthetic fibers such as nylon, mineral fibers such as asbestos, mineral wool, and glass, and animal fibers such as wool and goat hair. The thermal insulation may also be fabricated of wood, resins both homogeneous and cellular in structure, mixtures such as silicone and glass, or asbestos and polytetrafluoroethylene, and ceramic films and layers. A sheet of glass fibers is preferred. Such thermal insulation will have low heat capacity. The product of specific heat times density is preferably a minimum. The thermal insulation must be able to withstand any compression and heat to which it is subjected.

In making a calender or press roll of the present invention, the temperature range to be used should be decided upon. From this, it will be possible to calculate the power level needed for the particular process. The thermal insulation thickness within the stated limits may then be determined either by calculation or by trial and error to yield a minimum cycle time desired in the particular process. Choice of the highest power level feasible and the lowest conductivity of the thermal insulation will produce the shortest possible cycle.

Covering the outside of the calender roll, and electrically insulated from the foil heater against which it normally would rest, will be an outer facing surface or skin on the calender roll. While such a facing surface is preferably a metal, and preferably a thin metallic foil, it may be of such inert materials as resins or rubbers which are able to withstand the temperature for which the calender roll was designed to operate. The outer facing sheet of choice is a stainless steel foil which not only imparts a shiny smooth surface to the materials being calendered, but serves as a heat distributor to carry the heat from the serpentine foil heater across the small gaps which exist in the serpentine heater itself. Stainless steel outer facings also have the advantage of being inert under a wide variety of conditions.

The electrical circuitry is such that current passes only through the portion of the heater necessary to heat the desired portion of the skin. If several heaters are used adjacent to one another inside the skin, the current may pass through such heaters one at a time; as one heater passes out of the zone to be heated during calender rotation, an adjacent heater passes in. This circuitry is most easily accomplished by means of a commutator positioned on the axle of the calender roll. The commutator will rotate with the axle, while the brushes that deliver current to the commutator will remain fixed and in electrical contact with the commutator. One electrical brush will normally be electrically in contact with a ring which is connected to all of the electrical heaters in the roll. The other brush, riding over segments of the commutator insulated from each other, will be in electrical contact with only one or a limited number of the heaters. In this manner, electrical current is passed through only those heaters desired, and thus heat is supplied only in those areas desired.

Figure 1:
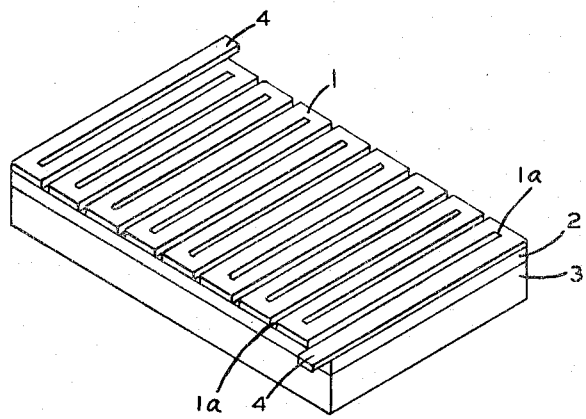
FIG. 1 shows a heating unit to be used in a calender or press roll in the present invention.
Figure 2:
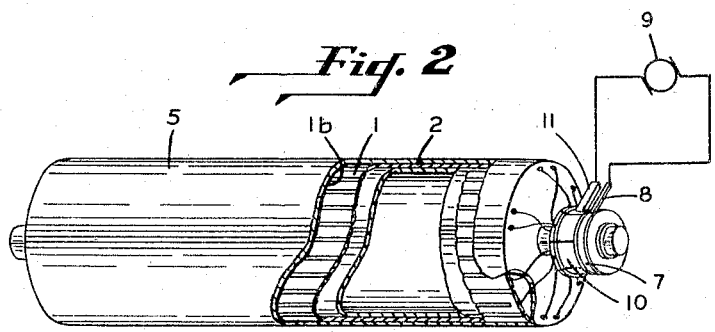
FIG. 2 shows a calender roll containing the heating unit of FIG. 1 conforming to curved surface.

Referring to FIG. 1, the metal foil serpentine heater 1 is mounted on the thermal insulation 2 which is in turn affixed to the heat sink 3. The heat sink 3 is the center metallic mass of the calender roll or it may be the water-cooled internal portion of the roll. Electrical connections 4 are adapted to allow lead wires to conduct electricity through the length of the serpentine foil heater 1. Gaps 1a are made by cutting or otherwise removing narrow strips from a foil sheet. The outer facing foil 5 protects the heater 1 from physical and chemical damage. An electrical insulation layer 1b, normally a varnish, electrically insulates the heater 1 from the facing foil 5.

Figure 3:
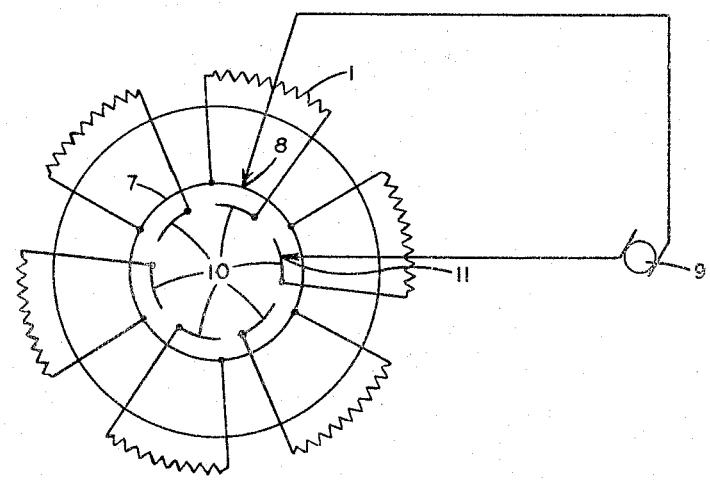
FIG. 3 shows in schematic form the electrical circuitry of a commutator and the heaters on the roll.

FIG. 3 shows the use of electrical brushes on the commutator in an end view. The electrical heaters 1 all have a common electrical contact with a brass ring 7 of the commutator through the fixed brush 8 connected to a source of electrical power 9. The insulated parts of segmented ring 10 are brought alternately into contact with the fixed brush 11 also connected to the source of power 9. Accordingly as the entire assembly, save for the fixed brushes 8 and 11, rotates, electrical current will flow alternately through the foil electrical resistant heaters 1. As a result, only limited zones of the surface of the calender roll will be heated along the axial length of the surface. Such an arrangement allows for hot calendering at the nip while at the same time allowing the quick cooling of the remainder of the surface of the roll in order to aid release of materials being calendered.

In this manner electrical current is used to supply heat only at the very point where it is needed. If it is desirable for the material being calendered to adhere to the calendering roll over a greater period, say, over half a revolution, the heated portion may be so adjusted that the current is maintained in the heater over a wider area. The quick cooling cycle takes over once the current is cut off from the serpentine heater, allowing the ready removal of the material being calendered from the outer facing foil 5 of the calender roll.

Figure 4:
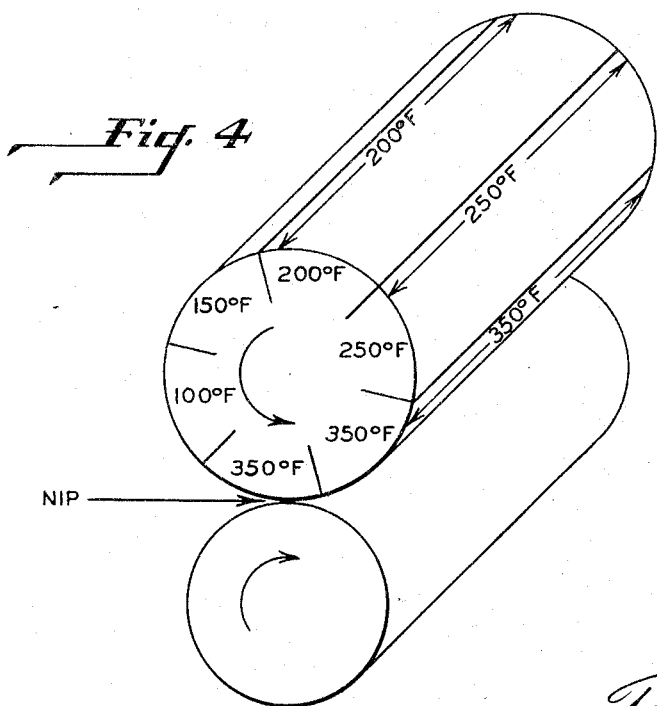
FIG. 4 illustrates one example of the zones of temperature differentials that may be maintained on the surface of a calender roll.

FIG. 4 is a schematic drawing of a calender roll according to the present invention, operating with a bottom roll, illustrating representative temperature zones that can be achieved in accordance with the present invention. The combination of the electrical foil heater, the critical thickness of the thermal insulation, and the heat sink enables the surface temperature of the calender roll to very quickly reach appreciable temperature levels, and just as quickly to cool off. The defined relationship of the heater, the thermal insulation and the heat sink allows temperature differentials of a few hundred degrees F. to be achieved in a matter of a few seconds.

I claim:

1. A calender roll adapted for rapid heating and cooling of predetermined zones over the outer surfaces thereof during a single revolution of the roll comprising in combination
    (a) a metallic foil electrical resistance heater in serpentine shape adapted to supply heat uniformly to the area to be heated,
    (b) a heat sink coextensive in area with said heater having a thermal conductivity of at least about 300 B.t.u.-inch/hr.-ft.$^2$-° F. positioned in the interior of the roll,
    (c) 0.0001–0.05 inch of thickness of thermal insulation coextensive in area with said heater and said heat sink having a maximum thermal conductivity of about 2 B.t.u.-inch/hr.-ft.$^2$-° F. positioned between and in contact with said heater and said heat sink,
    (d) a thin outer facing material having the curved configuration of said calender roll surrounding and electrically insulated from said serpentine foil heater, and
    (e) commutator means for sequentially passing electrical current through different portions of said serpentine heater to cause limited zones only of the surface of the calender roll to be heated along the axial length of the calender roll surface in response to rotation of said calender roll, whereby different temperature zones are established on the surface of the calender roll.

2. A calender roll according to claim 1 wherein said heater is copper foil in a serpentine configuration.

3. A calender roll according to claim 1 wherein said outer facing material comprises a stainless steel foil.

4. A calender roll according to claim 1 wherein said thermal insulation comprises a sheet of glass fibers

References Cited by the Examiner

UNITED STATES PATENTS

| | | | |
|---|---|---|---|
| 415,856 | 11/1889 | Carpenter | 219—469 X |
| 977,625 | 12/1910 | Hadaway | 219—244 X |
| 2,714,416 | 8/1955 | Fener | 219—243 X |
| 2,992,317 | 7/1961 | Hoffman | 219—202 |

RICHARD M. WOOD, *Primary Examiner.*

L. H. BENDER, *Assistant Examiner.*